US010740942B2

(12) United States Patent
Goslin et al.

(10) Patent No.: US 10,740,942 B2
(45) Date of Patent: *Aug. 11, 2020

(54) IMAGE CUSTOMIZATION USING A PERSONA

(71) Applicant: Disney Enterprises, Inc., Burbank, CA (US)

(72) Inventors: Michael P. Goslin, Sherman Oaks, CA (US); Mark Arana, Agoura Hills, CA (US); Leon Silverman, Encino, CA (US)

(73) Assignee: Disney Entperprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,018

(22) Filed: Dec. 9, 2019

(65) Prior Publication Data
US 2020/0118320 A1 Apr. 16, 2020

Related U.S. Application Data

(63) Continuation of application No. 16/053,594, filed on Aug. 2, 2018, now Pat. No. 10,540,797.

(51) Int. Cl.
G06T 11/60 (2006.01)
G06F 16/58 (2019.01)
A63F 13/67 (2014.01)
G06F 16/583 (2019.01)

(52) U.S. Cl.
CPC .............. *G06T 11/60* (2013.01); *A63F 13/67* (2014.09); *G06F 16/5838* (2019.01); *G06T 2200/24* (2013.01)

(58) Field of Classification Search
None
See application file for complete search history.

(56) References Cited

U.S. PATENT DOCUMENTS 10,540,797 B1 * 1/2020 Goslin .................... G06T 11/60
2015/0371447 A1 * 12/2015 Yasutake ............... G06T 19/006
345/420

* cited by examiner

Primary Examiner — Nurun N Flora
(74) Attorney, Agent, or Firm — Farjami & Farjami LLP

(57) ABSTRACT

An image management system includes a computing platform including a hardware processor and a system memory storing an image customization software code, and a database of personas assumable by a user, the database communicatively coupled to the image customization software code. The hardware processor executes the image customization software code to receive a wireless signal associating a persona stored in the database with the user, receive a digital image including an image of the user, and detect the image of the user in the digital image. The hardware processor further executes the image customization software code to obtain the persona from the database, and output a customized image to be rendered on a display, where the persona modifies the image of the user in the customized image.

20 Claims, 6 Drawing Sheets

IMAGE CUSTOMIZATION USING A PERSONA

The present application is a Continuation of U.S. application Ser. No. 16/053,594, filed Aug. 2, 2018, which is hereby incorporated by reference in its entirety into the present application.

BACKGROUND

Augmented reality (AR), in which real world objects and/or environments are digitally modified or replaced with virtual imagery, offer the opportunity to provide interactive experiences that are more immersive and entertaining. AR can be used to modify images of real world objects through augmentation, i.e., a user can see the real world through clear lenses with virtual projections on top. AR can be used to modify a real world image through augmentation, or through selective omission of a portion of an image of a real world object, where the view of the real-world comes from a headset mounted camera that is projected into VR space, so a user still sees much of the real world around them.

SUMMARY

There are provided systems and methods for performing image customization using a persona, substantially as shown in and/or described in connection with at least one of the figures, and as set forth more completely in the claims.

DETAILED DESCRIPTION

Figure 1:
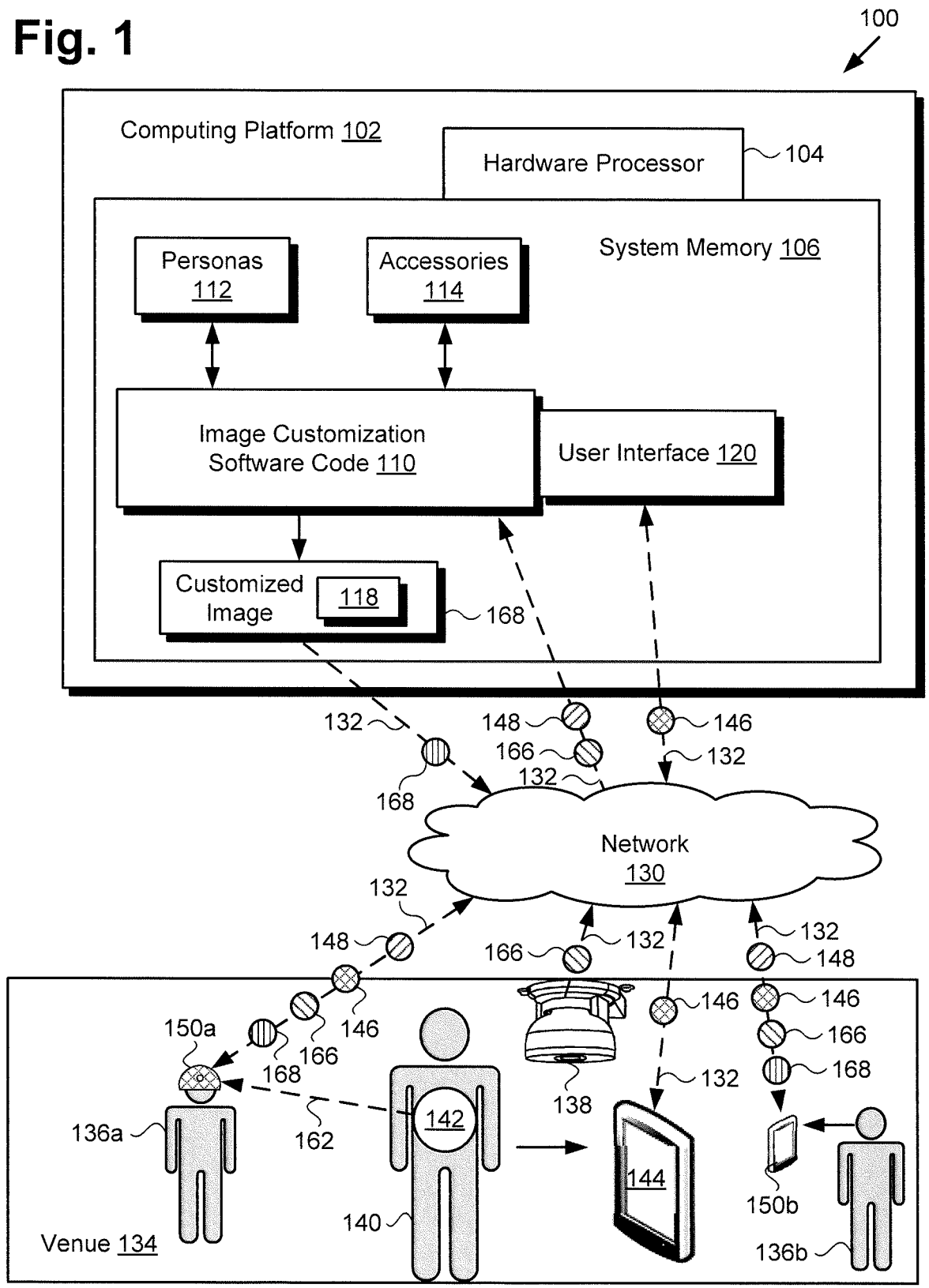
FIG. 1 shows a diagram of an exemplary image management system for performing image customization using a persona, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for performing image customization using a persona. As shown in FIG. 1, image management system 100 includes computing platform 102 having hardware processor 104, and system memory 106 implemented as a non-transitory storage device. According to the present exemplary implementation, system memory 106 stores image customization software code 110 providing user interface 120, and one or both of personas database 112 and accessories database 114.

As further shown in FIG. 1, computing platform 102 is implemented within a use environment including network 130, and venue 134 including user 140 wearing wearable item 142 and utilizing communication device 144. In addition, FIG. 1 shows image processing systems 150a and 150b used by respective observers 136a and 136b of user 140, venue camera or cameras 138 (hereinafter "venue camera(s) 138"), and wireless signal 162 transmitted by wearable device 142. Also shown in FIG. 1 are wireless network communication links 132, persona selection data 146, digital image 148 including an image of user 140, optical data 166, and customized image 168 including user persona 118 associated with user 140.

Image management system 100 may be utilized to customize an image portraying a human user, using a persona associated with that user. Image management system 100 may customize a digital image including an image of a user by receiving a wireless signal associating a persona stored in a database of personas with the user. Image management system 100 may further detect the image of the user in the digital image, obtain the persona associated with the user from the database, and output the customized image to be rendered on a display, where the persona associated with the user modifies the image of the user in the customized image. In one implementation, the persona associated with the user may include a virtual character that augments the image of the user in the customized image. For example, the user may appear to wear the virtual character like a costume. In another implementation, the persona associated with the user may include a virtual character that is substituted for the image of the user in the customized image. In yet another implementation, the persona associated with the user may be a privacy persona, resulting in the absence of an image being substituted for the image of the user in the customized image.

Thus, image management system 100 can be utilized to communicate and/or map user customization data to the real world. Moreover, in some implementations, image management system 100 can be utilized to reconcile game state data for an augmented reality (AR) game between AR devices; an action that requires information about both virtual and physical objects. As a result, image management system 100 represents an improvement to a computer system that advantageously enables a user with a communication device to exercise considerable control over how his or her image is viewed by other people wearing AR glasses or with an AR device such as a mobile phone or tablet computer.

As shown in FIG. 1, user 140 may utilize communication device 144 to interact with computing platform 102, via network 130 and user interface 120, to use image customization software code 110, executed by hardware processor 104, to associate user persona 118 with him or herself. Alternatively, or in addition, user persona 118 may be a permanent or temporary entitlement gifted to user 140 by another user, or due to actions performed by user 140. For example, in some implementations, user persona 118 may be gifted to user 140 as a reward for purchase of a product or service offered at venue 134, or due to participation by user 140 in a loyalty program associated with venue 134. User persona 118 may be a virtual character, for example, chosen by, purchased by, transferred to from another user, borrowed by, or gifted to user 140 as a temporary or permanent entitlement from among multiple personas stored in personas database 112, for example. Thus, personas database 112 is a database of personas assumable by user 140.

In some implementations, in addition to choosing, purchasing, receiving, borrowing, or being gifted with user persona 118, user 140 may interact with user interface 120 and image customization software code 110 to choose one or more accessories for user persona 118 from accessories database 114. Alternatively, or in addition, and for reasons similar to those discussed above with respect to user persona 118, one or more accessories for user persona 118 may be permanently or temporarily held as an entitlement by user 140. Where user persona 118 is a virtual character, accessories stored in accessories database 114 can include outfits, such as clothing, colors for enhancing the appearance of user persona 118, and weapons for use by user persona 118, to name a few examples.

As described in greater detail below, first and second observers 136a and 136b may utilize respective image processing systems 150a and 150b in venue 134 to view customized image 168 including user 140 in which the image of user 140 is modified by user persona 118 and/or by accessories for user persona 118. As also described in greater detail below, image processing systems 150a and 150b may identify user persona 118 associated with user 140, and/or accessories for user persona 118 available to user 140, based on data received wirelessly via network 130, through optical identification of wearable item 142, or from wireless signal 162 received directly from wearable item 142.

It is noted that although wearable item 142 is shown in FIG. 1 as a button or pin worn by user 140, that representation is merely exemplary. More generally, wearable item 142 may be any item suitable to be worn or carried by user 140 in venue 134. Thus, in various implementations, wearable item 142 may be a button, pin, or pendant, for example, or a wristband, ring, hat, or item of clothing. In some implementations, as shown in FIG. 1, wearable item 142 may be a device including a wireless transmitter, such as a radio-frequency identification (RFID) transmitter, for sending wireless signal 162 identifying user persona 118 and/or accessories for user persona 118.

It is also noted that although image processing systems 150a and 150b are shown respectively as a virtual reality (VR) headset and a mobile device in the form of a smartphone or tablet computer in FIG. 1, those representations are also provided merely as examples. More generally, image processing systems 150a and 150b may be any suitable mobile communication devices that can be worn or carried by first and second observers 136a and 136b, and capable of performing data processing sufficient to support wireless connections to network 130, display customized image 168 of user 140, and implement the functionality ascribed to image processing systems 150a and 150b herein. For example, in other implementations, image processing systems 150a and/or 150b may take the form of AR glasses.

In some implementations, venue 134 may take the form of an indoor venue. Such indoor venues may include a cinema, a theater, or a concert hall, to name a few examples. Alternatively, in some implementations, venue 134 may take the form of an outdoor venue. Such outdoor venues may include a park, for instance a theme park, or a resort property, again to name merely a few examples. Venue camera(s) 138 may be implemented as one or more fixed cameras and one or more mobile cameras for obtaining optical images throughout venue 134. Venue camera(s) 138 may be implemented as still image cameras and/or video cameras, for example.

It is noted that, although the present application refers to image customization software code 110 providing user interface 120, and one or both of personas database 112 and accessories database 114 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts image customization software code 110 providing user interface 120, and one or both of personas database 112 and accessories database 114 as being co-located in system memory 106, that representation is also provided merely as an aid to conceptual clarity. More generally, image management system 100 may include one or more computing platforms, such as computer servers for example, which may be co-located, or may form an interactively linked but distributed system, such as a cloud based system, for instance. As a result, hardware processor 104 and system memory 106 may correspond to distributed processor and memory resources within image management system 100. Thus, it is to be understood that image customization software code 110, and one or both of personas database 112 and accessories database 114 may be stored and/or executed using the distributed memory and/or processor resources of image management system 100.

In one implementation, computing platform 102 may correspond to one or more web servers, accessible over a packet-switched network such as the Internet, for example. Alternatively, computing platform 102 may correspond to one or more computer servers supporting a local area network (LAN), or included in another type of private network.

Although communication device 144 utilized by user 140 is shown as a mobile device in the form of a smartphone or tablet computer in FIG. 1, that representation is also provided merely as an example. More generally, communication device 144 may be any suitable mobile or stationary computing device or system remote from computing platform 102 and capable of performing data processing sufficient to utilize user interface 120, support connections to network 130, and implement the functionality ascribed to communication device 144 herein. For example, in other implementations, communication device 144 may take the form of a laptop or desktop computer, for example, may be a publicly accessible kiosk or computer terminal in venue 134, or may be a kiosk or computer terminal reserved for members of a loyalty program associated with venue 134.

Figure 2:
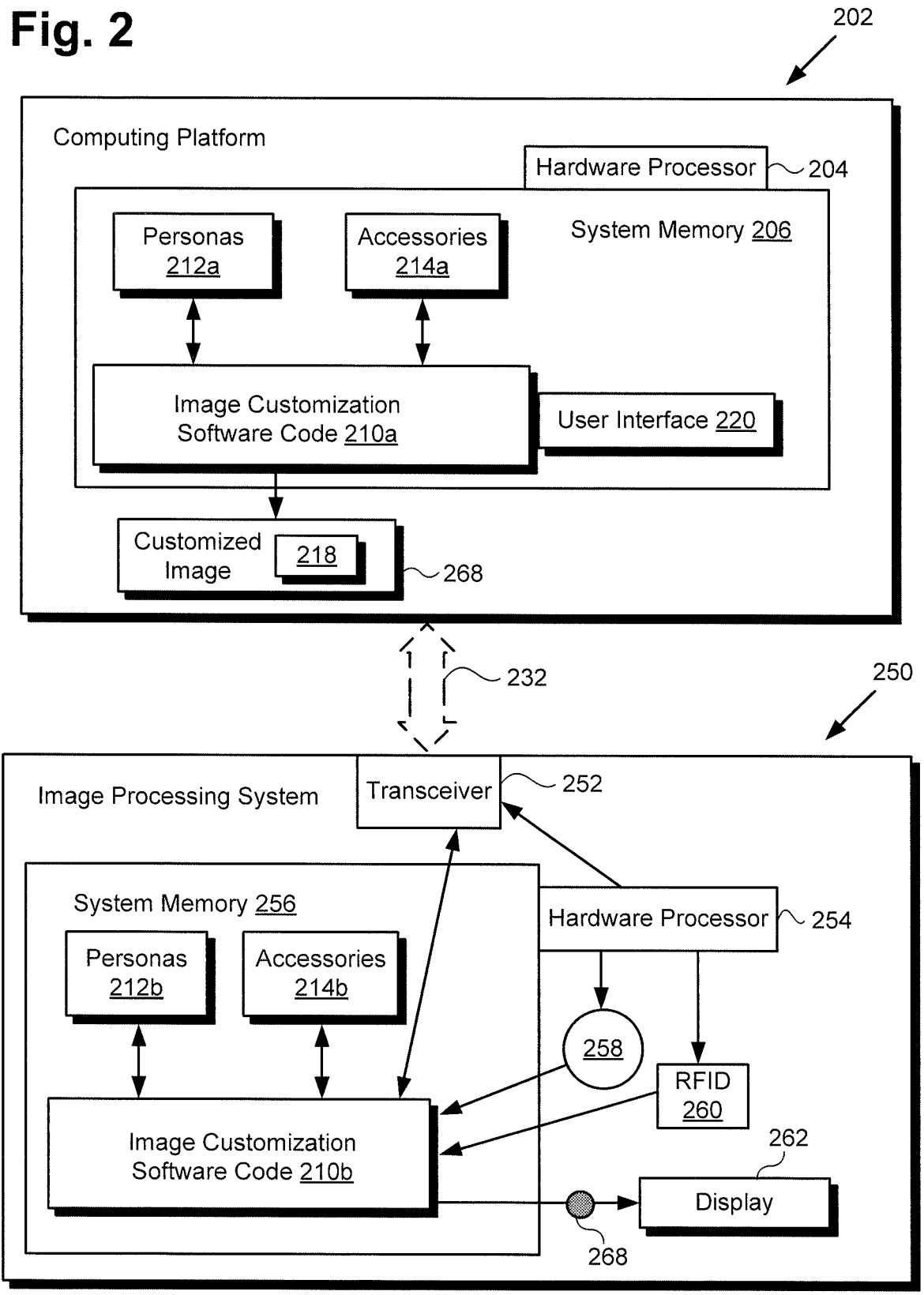
FIG. 2 shows a diagram including a more detailed exemplary representation of an image processing system suitable for use in performing image customization using a persona, according to one implementation.

FIG. 2 shows a more detailed representation of exemplary image processing system 250 in combination with computing platform 202. As shown in FIG. 2, image processing system 250 is communicatively coupled to computing platform 202 over wireless network communication link 232. Computing platform 202 includes hardware processor 204, and system memory 206 storing image customization software code 210a providing user interface 220, and one or both of personas database 212a and accessories database 214a.

As further shown in FIG. 2, image processing system 250 includes hardware processor 254, system memory 256 implemented as a non-transitory storage device storing image customization software code 210b and one or both of personas database 212b and accessories database 214b. As also shown in FIG. 2, image processing system 250 includes transceiver 252, camera 258, such as an outward facing camera or cameras, RFID reader 260, and display 262 receiving customized image 268 from image customization software code 210b.

Wireless network communication link 232 and computing platform 202 having hardware processor 204 and system memory 206, correspond in general to wireless network communication links 132 and computing platform 102 having hardware processor 104 and system memory 106, in FIG. 1. In addition, image customization software code 210a, user interface 220, personas database 212a, and accessories database 214a, in FIG. 2, correspond respectively in general to image customization software code 110, user interface 120, personas database 112, and accessories database 114, in FIG. 1. In other words, image customization software code 210a, user interface 220, personas database 212a, and accessories database 214a may share any of the characteristics attributed to respectively corresponding image customization software code 110, user interface 120, personas database 112, and accessories database 114 by the present disclosure, and vice versa.

It is noted that customized image 268 including user persona 218, in FIG. 2, corresponds in general to customized image 168 including user persona 118, in FIG. 1. Consequently, user persona 218 and customized image 268 may share any of the features or functionality attributed to user persona 118 and customized image 168 by the present disclosure, and vice versa. It is further noted that display 262 may be implemented as a liquid crystal display (LCD), a light-emitting diode (LED) display, an organic light-emitting diode (OLED) display, or any other suitable display screen that performs a physical transformation of signals to light.

Image processing system 250 corresponds in general to image processing systems 150a and 150b, in FIG. 1, and those corresponding features may share any of the characteristics attributed to either corresponding feature by the present disclosure. Thus, like image processing systems 150a and 150b, image processing system 250 may take the form of a mobile communication device such as a smartphone, AR glasses, or a VR headset. In addition, and although not shown in FIG. 1, image processing systems 150a and 150b may include features corresponding to hardware processor 254, transceiver 252, camera 258, RFID reader 260, display 262, and system memory 256 storing image customization software code 210b and one or both of personas database 212b and accessories database 214b.

With respect to image customization software code 210b, personas database 212b, and accessories database 214b, it is noted that in some implementations, image customization software code 210b may be a thin client application of image customization software code 110/210a. In those implementations, image customization software code 210b may enable image processing system 150a/150b/250 to process wireless signal 162 and/or to output customized image 168/268 including user persona 118/218. Moreover, in those implementations, system memory 256 of image processing system 150a/150b/250 may not store personas database 212b or accessories database 214b.

However, in other implementations, image customization software code 210b may include all of the features of image customization software code 110/210a, and may be capable of executing all of the same functionality. That is to say, in some implementations, image customization software code 210b corresponds to image customization software code 110/210a and may share any of the features and perform any of the processes attributed to those corresponding features by the present disclosure.

Furthermore, and as shown in FIG. 2, in implementations in which image customization software code 210b corresponds to image customization software code 110/210a, one or both of personas database 212b and accessories database 214b may be stored on system memory 256 of image processing system 150a/150b/250. It is also noted that, when present in system memory 256, personas database 212b and accessories database 214b correspond respectively in general to personas database 112/212a and accessories database 114/214b, and may share any of the characteristics attributed to those corresponding features by the present disclosure.

According to the exemplary implementation shown in FIG. 2, image customization software code 210b and one or both of personas database 212b and accessories database 214b are located in system memory 256, having been received via wireless network communication link 132/232, either from computing platform 102/202 or an authorized third party source of image customization software code 210b and one or both of personas database 212b and accessories database 214b. In one implementation, wireless network communication link 132/232 corresponds to transfer of image customization software code 210b and one or both of personas database 212b and accessories database 214b over a packet-switched network, for example. Once transferred, for instance by being downloaded over wireless network communication link 132/232, image customization software code 210b and one or both of personas database 212b and accessories database 214b may be persistently stored in device memory 256, and image customization software code 210b may be executed locally on image processing system 150a/150b/250 by hardware processor 254.

Hardware processor 254 may be the central processing unit (CPU) for image processing system 150a/150b/250, for example, in which role hardware processor 254 runs the operating system of image processing system 150a/150b/250 and executes image customization software code 210b. As noted above, image processing system 150a/150b/250 can utilize image customization software code 210b, either as a thin client application or as a software module having all of the features and functionality of image customization software code 110/210a, to output customized image 168/268 for rendering on display 262.

Customized image 168/268 is based on digital image 148 including an image of user 140. However, in customized image 168/268, the image of user 140 present in digital image 148 is modified by user persona 118/218. In one implementation, for instance, user persona 118/218 may be a virtual character that augments the image of user 140 in customized image 168/268. For example, user 140 may appear to first and second observers 136*a* and 136*b* in customized image 168/268 as though user 140 is wearing user persona 118/218 as a costume. In another implementation, user persona 118/218 may include a virtual character that is substituted for the image of user 140 in customized image 168/268. In yet another implementation, user persona 118/218 associated with user 140 may be a privacy persona, resulting in the absence of an image being substituted for the image of user 140 in customized image 168/268. For example, a celebrity may not wish to appear or be recognizable in customized image 168/268.

Figure 3:
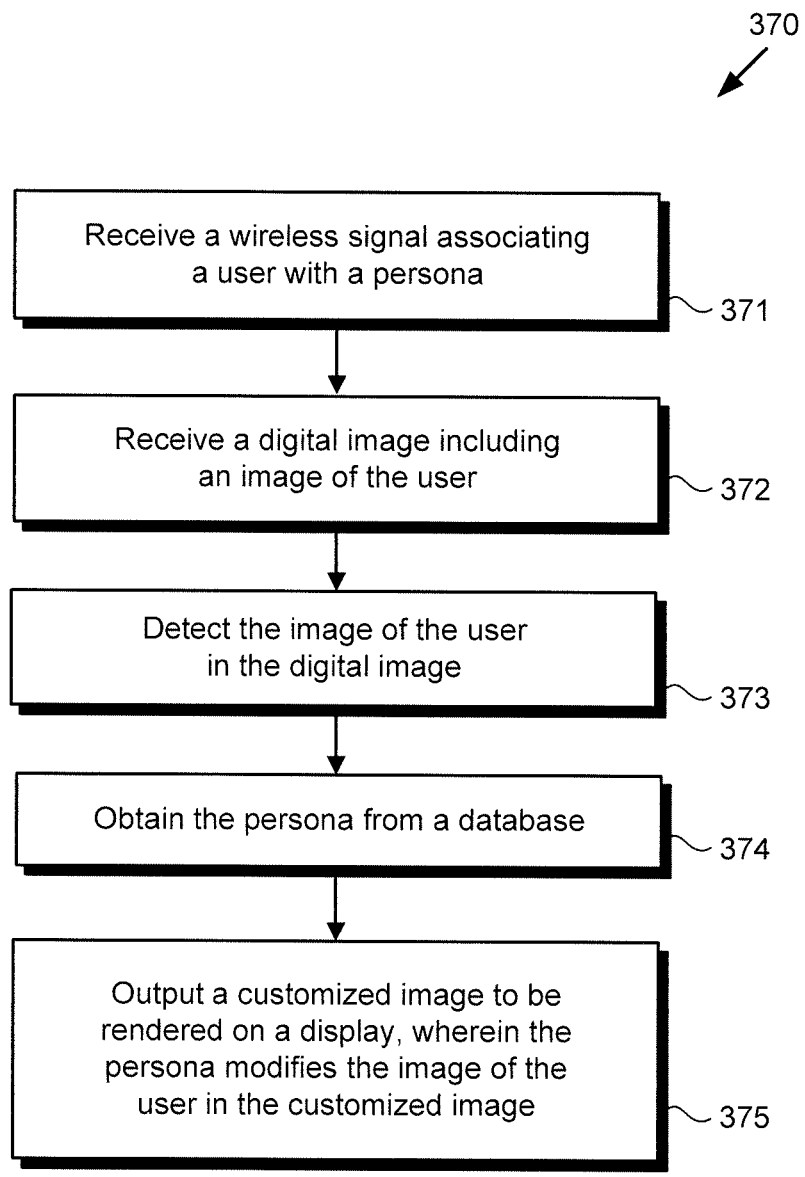
FIG. 3 shows a flowchart presenting an exemplary method for performing image customization using a persona, according to one implementation.
Figure 4:
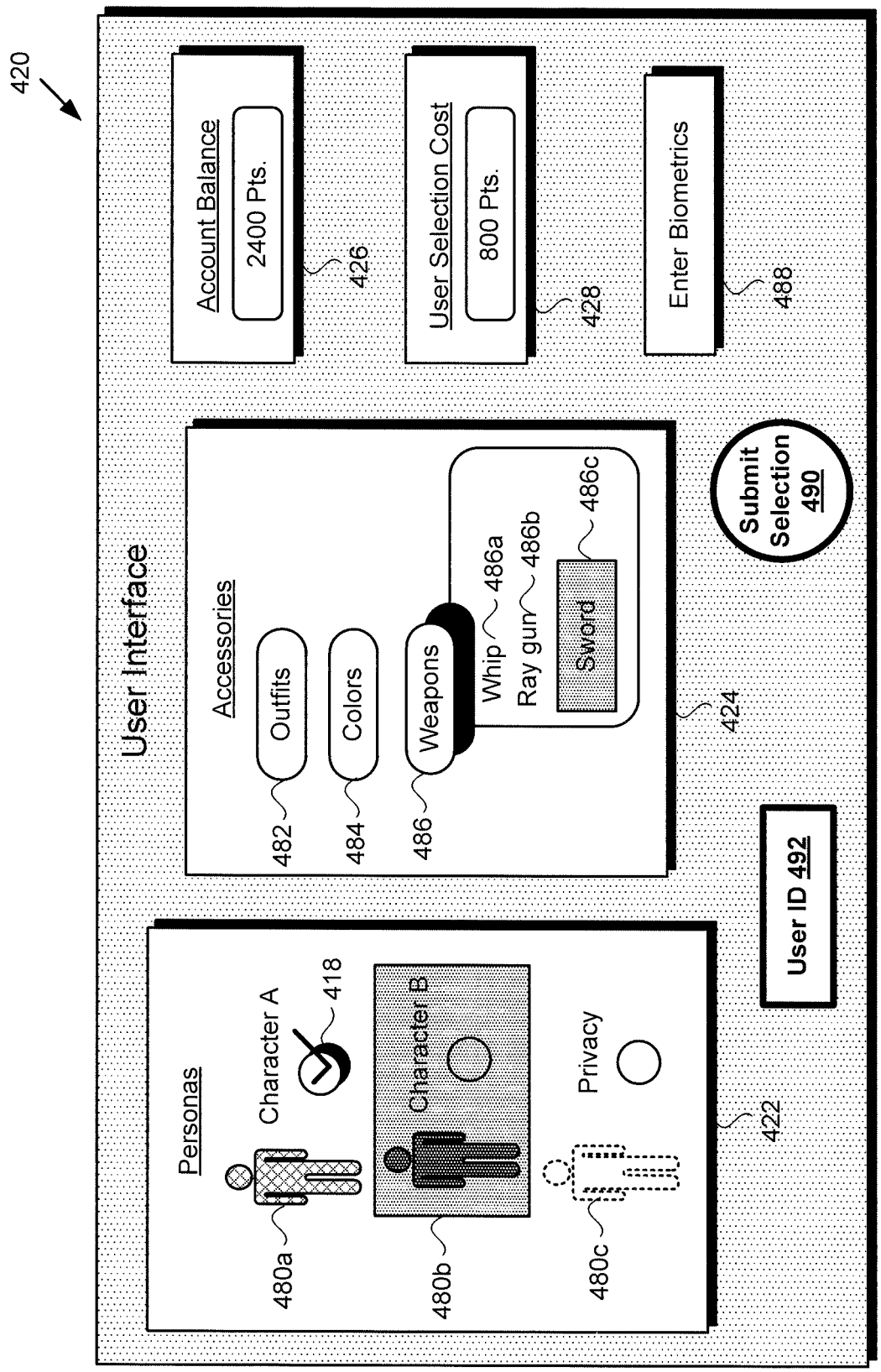
FIG. 4 shows an exemplary user interface suitable for use as part of a system for performing image customization using a persona, according to one implementation.
Figure 5A:
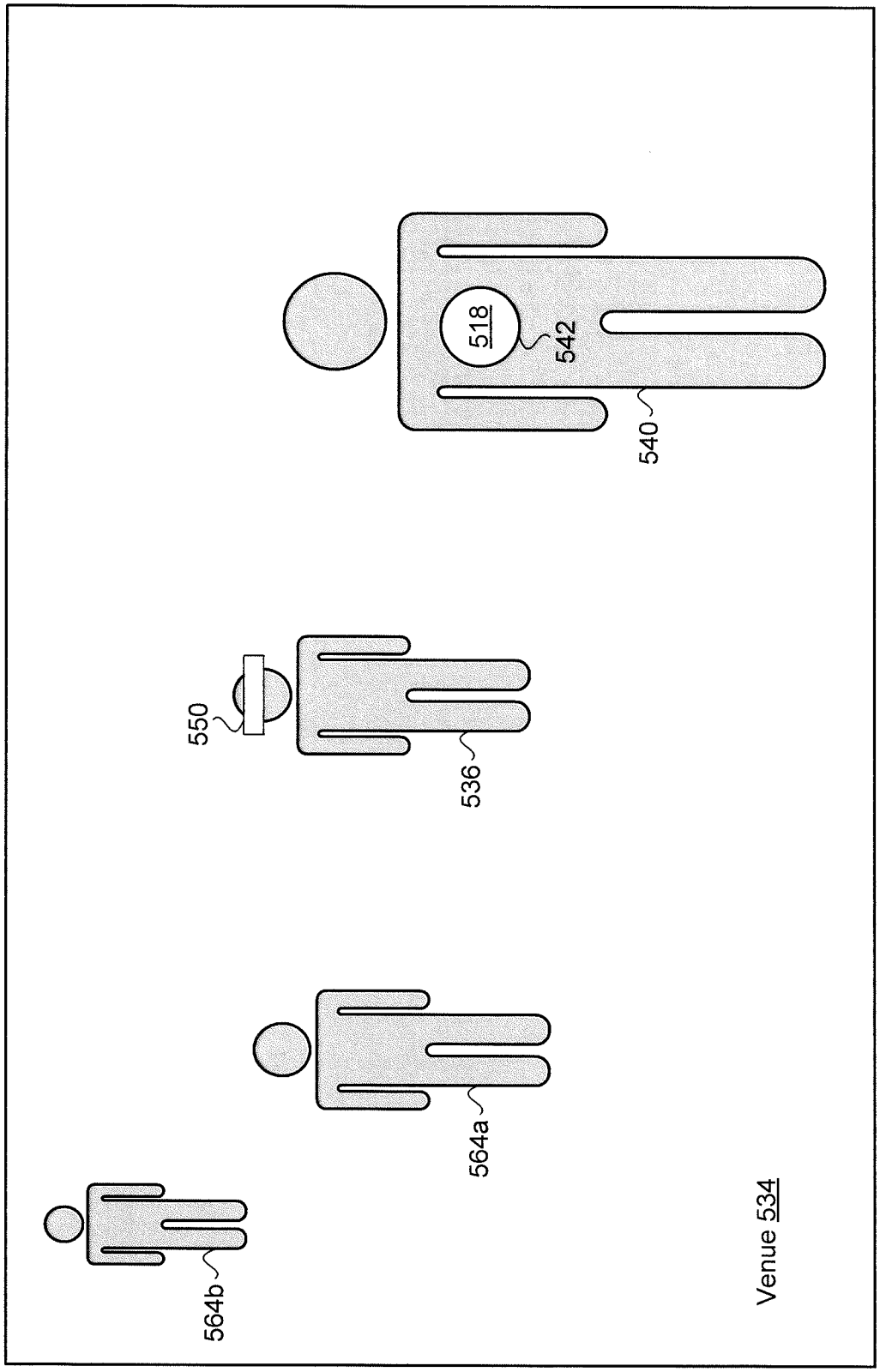
FIG. 5A shows an exemplary venue including a user wearing a wearable item configured to identify a persona associated with the user, as well as other visitors to the venue observing the user.
Figure 5B:
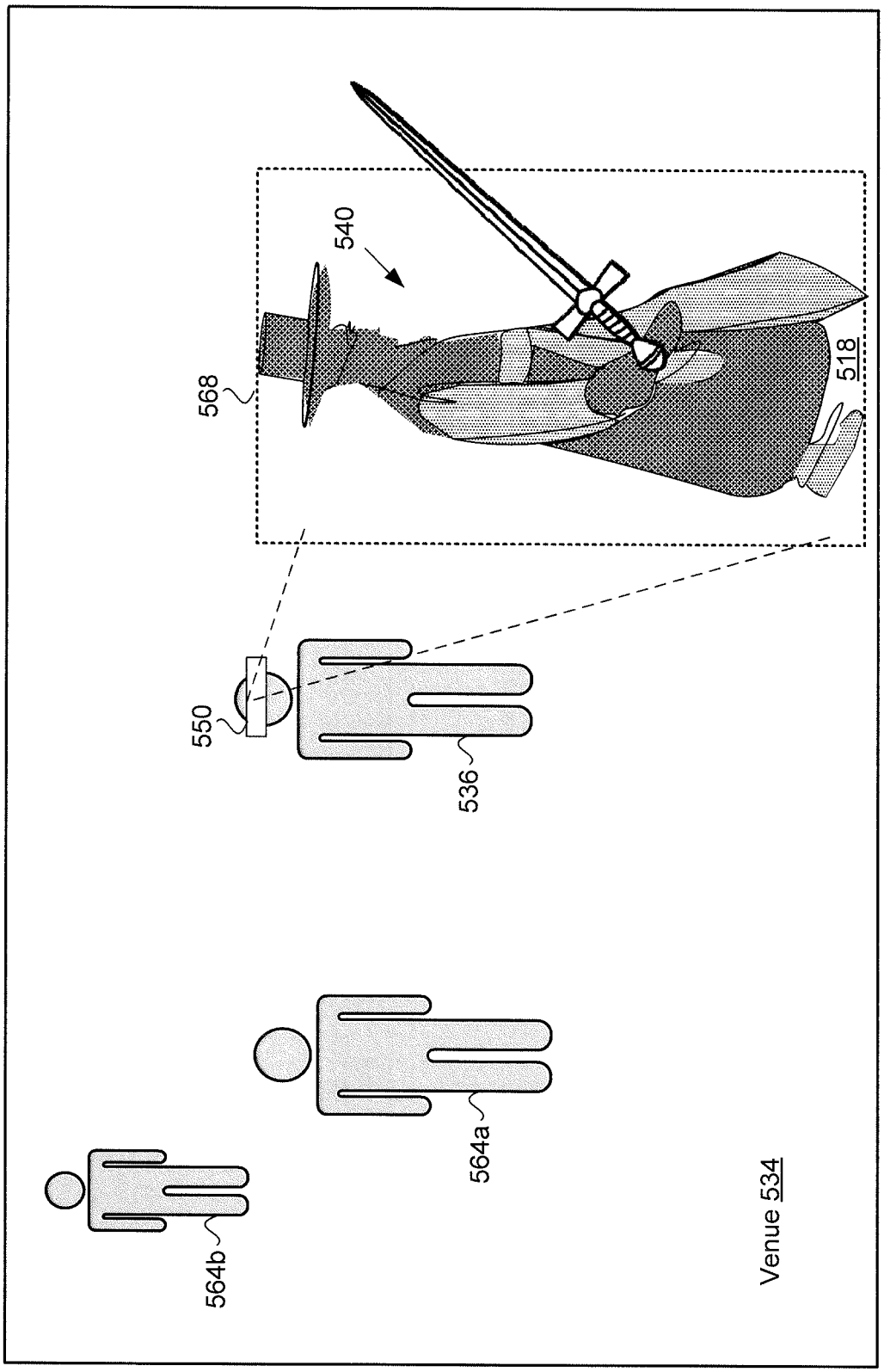
FIG. 5B shows a customized image including an image of the user in FIG. 5A modified by the persona associated with the user.

The functionality of image management system 100 and image processing system 150*a*/150*b*/250 and will be further described by reference to FIG. 3, with further reference to FIGS. 4, 5A, and 5B. FIG. 3 shows flowchart 370 presenting an exemplary method for performing image customization using a persona, according to one implementation. FIG. 4 shows an exemplary user interface suitable for use as part of the image management systems shown in FIGS. 1 and 2. FIG. 5A shows an exemplary venue including a user wearing a wearable item configured to identify a persona associated with the user, as well as an observer of the user, while FIG. 5B shows a customized image including the image of the user in FIG. 5A modified by the persona associated with the user. With respect to the method outlined in FIG. 3, it is noted that certain details and features have been left out of flowchart 370 in order not to obscure the discussion of the inventive features in the present application.

Referring to FIG. 3 in combination with FIGS. 1 and 2, flowchart 370 begins with receiving a wireless signal associating user 140 with user persona 118/218 stored in personas database 112/212*a*/212*b* (action 371). Depending upon the specific implementation, the wireless signal associating user 140 with user persona 118/218 may take a variety of forms. As noted above, in some implementations, wearable item 142 may be a button, pin, pendant, wristband, ring, hat, or item of clothing for example, including an RFID or other wireless transmitter for sending wireless signal 162 identifying user persona 118/218. In those implementations, wireless signal 162 associating user 140 with user persona 118/218 may be received directly from wearable item 142 by image processing system 150*a*/150*b*/250, using RFID reader 260 for example. That is to say, in those implementations, wireless signal 162 associating user 140 with user persona 118/218 may be received by image customization software code 210*b*, executed by hardware processor 254.

In other implementations, the wireless signal associating user 140 with user persona 118/218 may be provided by wireless network communication links 132/232, in the form of optical data 166, for example. In some of those implementations, optical data 166 obtained using venue camera(s) 138 and/or camera 258 of image processing system 150*a*/150*b*/250 and including an image of wearable device 142 may be used to associate user 140 with user persona 118/218 based on object recognition of wearable device 142. In implementations in which optical data 166 is received by computing platform 102, optical data 166 may be received wirelessly via network 130 by image customization software code 110/210*a*, executed by hardware processor 104/204. In implementations in which optical data 166 is received by image processing system 150*a*/150*b*/250, optical data 166 may be received wirelessly via network 130 using transceiver 252, or directly from camera 258, by image customization software code 210*b*, executed by hardware processor 254.

In yet other implementations, the wireless signal associating user 140 with user persona 118/218 may be provided by wireless network communication links 132/232, in the form of persona selection data 146 generated in response to an input to user interface 120/220 by user 140. Referring to FIG. 4, FIG. 4 shows exemplary user interface 420 identifying user 140 by user ID 492, and including personas selection menu 422, accessories selection menu 424, user account balance 426, user selection cost 428, enter biometrics option 488, and submit selection button 490. User interface 420 corresponds in general to user interface 120/220, in FIGS. 1 and 2. As a result, user interface 420 may share any of the characteristics attributed to corresponding user interface 120/220 by the present disclosure, and vice versa. Thus, although not shown in FIGS. 1 and 2, user interface 120/220 may include features corresponding respectively to personas selection menu 422, accessories selection menu 424, user account balance 426, user selection cost 428, enter biometrics option 488, and submit selection button 490.

It is noted that user ID 492 is exclusive of personally identifiable information (PII) of user 140. Thus, although user ID 492 enables image management system 100 to distinguish anonymous user 140 from other anonymous users, image management system 100 is not configured to retain information describing the age, gender, race, ethnicity, or any other PII of any user interacting with image management system 100.

According to the implementation shown in FIG. 4, personas 480*a* and 480*b* are virtual characters stored in personas database 112/212*a*/212*b*, while persona 480*c* is a privacy persona assumable by user 140. As shown in FIG. 4, persona 480*b* is grayed out or otherwise obscured to indicate that persona 480*b* is not presently selectable and assumable by user 140. Persona 480*b* may not be presently selectable or assumable by user 140 for any of a variety of reasons. For example, the user selection cost 428 associated with selecting persona 480*b* may exceed the user account balance 426. Alternatively, selection of persona 480*b* may require a status in a loyalty program associated with venue 134 not yet achieved by user 140.

As yet another alternative, selection of persona 480*b* by user 140 may be predicated on a purchase or the performance of an action not yet completed by user 140. For instance selection of persona 480*b* by user 140 may become available as a reward for appearing in a requisite minimum number of photos taken in venue 134, or for appearing in more photos than other users. As another example, user 140 may receive a recommendation via user interface 120/220/420 to purchase or rent a particular movie, game, or other item of content. Subsequent rental or purchase of that item of content by user 140 may be rewarded through enablement of selection of persona 480*b* by user 140.

As further shown by FIG. 4, of the two personas selectable and assumable by user 140, i.e., personas 480*a* and 480*c*, persona 480*a* has been selected as user persona 418 based on an input to user interface 120/220/420 by user 140, resulting in generation of persona selection data 146. It is noted that, user persona 418 corresponds in general to user persona 118/218, in FIGS. 1 and 2, and may share any of the characteristics attributed to that corresponding feature by the present disclosure.

It is further noted that, in addition to selection of persona 480*a* as user persona 118/218/418, user interface 120/220/420 may further enable user 140 to select one or more accessories for user persona 118/218/418 from accessories selection menu 424. As shown in FIG. 4, accessories stored in accessories database 114/214*a*/214*b* for user persona 118/218/418 include outfits 482, such as clothing, colors 484 for enhancing the appearance of user persona 118/218/418, and weapons 486. Selection of weapons 486 by user 140 may open a submenu including the options whip 486a, ray gun 486b, and sword 486c, for example.

As also shown in FIG. 4, sword 486c is grayed out or otherwise obscured to indicate that sword 486c is not presently selectable as an accessory for user persona 118/218/418 by user 140. Sword 486c may not be presently selectable by user 140 for reasons similar to those discussed above with respect to persona 480b. In one implementation, for example, the status of sword 486c as selectable or not selectable may change in response to an action by user 140. As a specific example, where persona 480a is a virtual character from a science fiction movie to which user 140 has purchased a ticket or otherwise acquired an entitlement, but has not yet attended or viewed, the pre-screening or pre-show status of sword 486c may be not selectable.

However, after viewing of the movie by user 140, such as through attendance of a screening or as a result of viewing a digital stream of the movie, the post-screening or post-show status of sword 486c may become selectable, or may be automatically provided as a permanent or temporary entitlement to user 140 as a reward for viewing the movie. It is noted that in some implementations, a costume corresponding to user persona 118/218/418 may be handed out as a reward for viewing the movie.

Thus, in some implementations, entitlements to user persona 118/218/418 and/or accessories for user persona 118/218/418 may be provided as a bonus or award to user 140 for achieving status as a super fan, or if user 140 views the movie a second time. Alternatively, or in addition, the expiration of an entitlement to user persona 118/218/418 and/or accessories for user persona 118/218/418 may be extended or delayed as a reward for super fan status or if user 140 views the movie a second time.

As another specific example, where persona 480a is a virtual character from a video game, sword 486c may not be selectable by user 140 until user 140 has played the game one or more times, or has achieved a predetermined status or proficiency level in the video game. However, after playing the video game the requisite number of times, or achieving the required status or proficiency level, sword 486c may become selectable by user 140, or may be automatically provided as a permanent or temporary entitlement to user 140 as a reward for playing the video game or achieving the required status or proficiency level.

It is noted that the pre-show and post-show status, or the pre video gaming and post video gaming status, of sword 486c may be similarly applied to the availability for selection of persona 480b as user persona 118/218/418, as well as to selection of any other accessories offered by accessories selection menu 424. In addition, in some implementations, additional points may be credited to user account balance 426 as a post-show or post video gaming reward for viewing the movie or playing the video game. It is further noted that analogous pre-show and post-show availability for selection of personas from personas selection menu 422, and/or accessories from accessories selection menu 424, and/or the awarding of post-show credits may apply to attendance at a theater play, Broadway style musical, opera, concert, or sporting event, for example.

With respect to action 371 of flowchart 370, in implementations in which persona selection data 146 is received by computing platform 102, persona selection data 146 may be received wirelessly via network 130 by image customization software code 110/210a, executed by hardware processor 104/204. In implementations in which persona selection data 146 is received by image processing system 150a/150b/250, persona selection data 146 may be received wirelessly via network 130 by image customization software code 210b, executed by hardware processor 254, and using transceiver 252.

Flowchart 370 continues with receiving digital image 148 including an image of user 140 (action 372). Digital image 148 may be a red-green-blue (RGB) image obtained by a digital camera, such as a digital still image camera for example. Alternatively, digital image 148 may be an RGB image taken from a video clip obtained by a digital video camera.

In some implementations, hardware processor 254 of image processing system 150a/150b/250 may execute image customization software code 210b to obtain digital image 148 using camera 258. In some of those implementations, digital image 148 may be transmitted by image processing system 150a/150b/250, using transceiver 252, to computing platform 102/202 via network 130 and wireless network communication links 132/232. In those implementations, digital image 148 may be received by image customization software code 110/210a, executed by hardware processor 104/204 of computing platform 102/202. However, in other implementations, digital image 148 may be received from camera 258 by image customization software code 210b, executed by hardware processor 254 of image processing system 150a/150b/250.

Alternatively, or in addition, in some implementations, digital image 148 may be obtained using venue camera(s) 138. In some of those implementations, digital image 148 may be transferred from venue camera(s) 138 to computing platform 102/202 via network 130 and wireless network communication links 132/232. In those implementations, digital image 148 may be received by image customization software code 110/210a, executed by hardware processor 104/204 of computing platform 102/202. However, in other implementations, digital image 148 may be received from venue camera(s) 138 or from computing platform 102/202 by image customization software code 210b, executed by hardware processor 254 of image processing system 150a/150b/250.

Flowchart 370 continues with detecting the image of user 140 in digital image 148 (action 373). The image of user 140 may be detected in digital image 140 using any of several of techniques. For example, the image of user 140 may be detected in digital image 148 through skeleton tracking performed based on optical data 166 obtained by venue camera(s) 138. Alternatively, or in addition, the image of user 140 may be detected in digital image 148 based on biometric data, such as bone structure, the gait or manner of walking of user 140, or based on artifacts of one or more articles of clothing or personal accessories worn by user 140, such as a hat.

Referring to FIG. 4, for example, in one implementation, user 140 may utilize enter biometrics option 488 through user interface 120/220/420 to submit biometrics data in the form of a facial image, body image, or retinal scan, for example. In those implementations, such biometrics data may be included in persona selection data 146 generated in response to the inputs to user interface 120/220/420 by user 140. As a specific example, where a facial image of user 140 is included in persona selection data 146, the image of user 140 in digital image 148 may be detected using facial recognition techniques. Alternatively, or in addition, where user interface 120/220/420 is executed on communication device 144 in the form of a mobile phone or tablet computer of user 140, for example, biometric data stored on communication device 144 may be accessed, either automatically or subsequent to an opt in selection by user 140.

In implementations in which digital image 148 is received by image customization software code 110/210a, detection of the image of user 140 in digital image 148 may be performed by image customization software code 110/210a, executed by hardware processor 104/204 of computing platform 102/202. In implementations in which digital image 148 is received by image customization software code 210b, detection of the image of user 140 in digital image 148 may be performed by image customization software code 210b, executed by hardware processor 254 of image processing system 150a/150b/250.

Flowchart 370 continues with obtaining user persona 118/218/418 from personas database 112/212a/212b (action 374). In some implementations, hardware processor 104/204 of computing platform 102/202 may execute image customization software code 110/210a to obtain user persona 118/218/418 from personas database 112/212a. In some of those implementations, user persona 118/218/418 may be transmitted to image processing system 150a/150b/250 via network 130 and wireless network communication links 132/232. In other implementations, hardware processor 254 of image processing system 150a/150b/250 may execute image customization software code 210b to obtain user persona 118/218/418 from personas database 212b stored locally on system memory 256 of image processing system 150a/150b/250.

According to some implementations, action 374 may further include obtaining one or more accessories for user persona 118/218/418 from accessories database 114/214a/214b. In some implementations, hardware processor 104/204 of computing platform 102/202 may execute image customization software code 110/210a to obtain accessories for user persona 118/218/418 from accessories database 114/214a. In some of those implementations, the one or more accessories for user persona 118/218/418 may be transmitted to image processing system 150a/150b/250 via network 130 and wireless network communication links 132/232. In other implementations, hardware processor 254 of image processing system 150a/150b/250 may execute image customization software code 210b to obtain one or more accessories for user persona 118/218/418 from accessories database 214b stored locally on system memory 256 of image processing system 150a/150b/250.

Flowchart 370 can conclude with outputting customized image 168/268 to be rendered on display 262, where user persona 118/218/418 modifies the image of user 140 in customized image 168/268 (action 375). In some implementations in which user persona 118/218/418 is obtained by image customization software code 110/210a, image customization software code 110/210a may be further executed by hardware processor 104/204 of computing platform 102/202 to output customized image 168/268 by transmitting customized image 168/268 to image processing system 150a/150b/250 via network 130 and wireless network communication links 132/232. However, in implementations in which user persona 118/218/418 is obtained by image customization software code 210b, hardware processor 254 of image processing system 150a/150b/250 may execute image customization software code 210b to output customized image 168/268 and to render customized image 168/268 on display 262.

FIG. 5A shows venue 534 including user 540 wearing wearable item 542 associating user 540 with user persona 518, while FIG. 5B shows customized image 568 including the image of user 540 modified by user persona 518, as viewed by observer 536 utilizing image processing system 550. Also included in FIGS. 5A and 5B are other visitors 564a and 564b to venue 534 who are not utilizing an image processing system to view user 540.

It is noted that venue 534, user 540, and wearable item 542 correspond respectively in general to venue 134, user 140, and wearable item 142, in FIG. 1, while observer 536 corresponds in general to either or both of first and second observers 136a and 136b. Consequently, venue 534 and wearable item 542 may share any of the characteristics attributed to respective venue 134 and wearable item 142 by the present disclosure, and vice versa. Image processing system 550, in FIGS. 5A and 5B, corresponds in general to image processing system 150a/150b/250, in FIGS. 1 and 2, and may share any of the characteristics attributed to that corresponding feature above. In addition, customized image 568, in FIG. 5B, corresponds in general to customized image 168/268, in FIGS. 1 and 2, and may share any of the characteristics attributed to that corresponding feature above. Moreover, user persona 518 corresponds in general to user persona 118/218/418 in FIGS. 1, 2, and 4, and may share any of the characteristics attributed to that corresponding feature above.

As shown in FIGS. 5A and 5B, user persona 118/218/418/518 modifies the image of user 140/540 in customized image 168/268/568. Customized image 168/268/568 is the image seen by observer 136a/136b/536 using image processing system 150a/150b/250/550 in venue 134/534. As shown in FIG. 5B, in some implementations, user persona 118/218/418/518 may be fit to the image of user 140/540 in customized image 168/268/568. In some implementations, for example, image customization software code 110/210a/210b may be configured to substantially match one or more of the size, height, and body shape of user 140/540 to a character model corresponding to user persona 118/218/418/518. In some of those implementations, data corresponding to the size, and/or height, and/or shape of user 140/540 may be provided by user 140/540 through user interface 120/220/420 and enter biometrics option 488. However, it is reiterated that the image management solution disclosed in the present application is not configured to retain information describing the age, gender, race, ethnicity, or any other PII of any user interacting with image management system 100.

It is noted that although the present disclosure emphasized modification of an image of user 140/540 by user persona 118/218/418/518, the image management solution disclosed herein may be adapted by one of ordinary skill in the art to modify the images of other visitors 564a and 564b to venue 134/534 and/or observer 136a/136b/536 based on a persona or personas selected by user 140/540. For example, it may be desirable to user 140/540 that a photograph of user 140/540 taken in venue 134/534, for example using venue camera(s) 138, show user 140/540 in the company of virtual characters, rather than in the presence of visitors 564a and 564b and observer 136a/136b/536. In those cases, the present solution may be adapted to enable user 140/540 to modify the images of visitors 564a and 564b and observer 136a/136b/536 in such a photograph by augmenting their respective images with virtual characters worn as costumes, or by substitution of their images by virtual characters selected by user 140/540.

Thus, the present application discloses image management solutions for customizing a digital image including an image of a user, using a persona associated with the user. The present solution includes receiving a wireless signal associating the persona with the user. The present solution further includes detecting the image of the user in the digital image, obtaining the persona associated with the user from a database, and outputting the customized image to be rendered on a display, where the persona associated with the user modifies the image of the user in the customized image. As a result, the image management systems and methods disclosed by the present application advantageously enable a user to exercise considerable control over how his or her image is viewed by others.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A wireless device worn or carried by a first user for use with a computing platform and a wireless transmitter worn or carried by a second user, the computing platform having a database in which personas are stored, the wireless device comprising:
    a hardware processor;
    a display; and
    a camera;
    the hardware processor configured to:
        wirelessly receive a signal transmitted by the wireless transmitter worn or carried by the second user;
        provide at least some information contained in the signal to the computing platform to associate the signal with one of the personas stored in the database;
        obtain, using the camera, a digital image including an image of the second user;
        provide the digital image to the computing platform;
        receive a customized image from the computing platform, the customized image including a modified image of the second user in the digital image resulting from modifying the image of the second user using the associated one of the personas; and
        render, on the display of the wireless device, the customized image including the modified image of the second user.

2. The wireless device of claim 1, wherein the signal is indicative of the associated one of the personas.

3. The wireless device of claim 1, wherein the associated one of the personas comprises a virtual character, and wherein modifying the image of the second user in the customized image includes using the virtual character to augment the image of the second user in the customized image.

4. The wireless device of claim 1, wherein the associated one of the personas comprises a virtual character, and wherein modifying the image of the second user in the customized image includes the virtual character being substituted for the image of the second user in the customized image.

5. The wireless device of claim 1, wherein the associated one of the personas comprises a privacy persona, and wherein modifying the image of the second user in the customized image results in an absence of the image of the second user in the customized image.

6. The wireless device of claim 1, wherein the image of the second user is detected based on biometric data.

7. The wireless device of claim 1, wherein the associated one of the personas is determined based on an input from the second user.

8. The wireless device of claim 1, wherein the wireless device comprises an augmented reality (AR) glasses worn by the first user.

9. The wireless device of claim 1, wherein the wireless device comprises a virtual reality (VR) headset worn by the first user.

10. A method of using a wireless device worn or carried by a first user in conjunction with a computing platform and a wireless transmitter worn or carried by a second user, the wireless device comprising a hardware processor, a display and a camera, the computing platform having a database in which personas are stored, the method comprising:
    wirelessly receiving, using the hardware processor, a signal transmitted by the wireless transmitter worn or carried by the second user;
    providing, using the hardware processor, at least some information contained in the signal to the computing platform to associate the signal with one of the personas stored in the database;
    obtaining, using the camera, a digital image including an image of the second user;
    providing, using the hardware processor, the digital image to the computing platform;
    receiving, using the hardware processor, a customized image from the computing platform, the customized image including a modified image of the second user in the digital image resulting from modifying the image of the second user using the associated one of the personas; and
    rendering, on the display of the wireless device, the customized image including the modified image of the second user.

11. The method of claim 10, wherein the signal is indicative of the associated one of the personas in the database.

12. The method of claim 10, wherein the associated one of the personas comprises a virtual character, and wherein modifying the image of the second user in the customized image includes using the virtual character to augment the image of the second user in the customized image.

13. The method of claim 10, wherein the associated one of the personas comprises a virtual character, and wherein modifying the image of the second user in the customized image includes the virtual character being substituted for the image of the second user in the customized image.

14. The method of claim 10, wherein the associated one of the personas comprises a privacy persona, and wherein modifying the image of the second user in the customized image results in an absence of the image of the second user in the customized image.

15. The method of claim 10, wherein the image of the second user is detected based on biometric data.

16. The method of claim 10, wherein the associated one of the personas is determined based on an input from the second user.

17. The method of claim 10, wherein the wireless device comprises an augmented reality (AR) glasses worn by the first user.

18. The method of claim 10, wherein the wireless device comprises a virtual reality (VR) headset worn by the first user.

19. A wireless device worn or carried by a first user for use with an image customization software code, a wireless transmitter worn or carried by a second user, and a database in which personas are stored, the wireless device comprising:
    a hardware processor;
    a display; and
    a camera;
    the hardware processor configured to:
        wirelessly receive a signal transmitted by the wireless transmitter worn or carried by the second user;
        provide at least some information contained in the signal to the image customization software code to associate the signal with one of the personas stored in the database;
        obtain, using the camera, a digital image including an image of the second user;
        provide the digital image to the image customization software code;
        receive a customized image from the image customization software code, the customized image including a modified image of the second user in the digital image resulting from modifying the image of the second user using the associated one of the personas; and
        render, on the display of the wireless device, the customized image including the modified image of the second user.

20. The wireless device of claim 19, wherein the image customization software code is stored in a memory of the wireless device or a computing platform configured to wirelessly communication with the wireless device.

\* \* \* \* \*